Sept. 13, 1927. 1,642,576
E. W. CANNAM ET AL
TIRE LOCK
Filed July 1, 1926
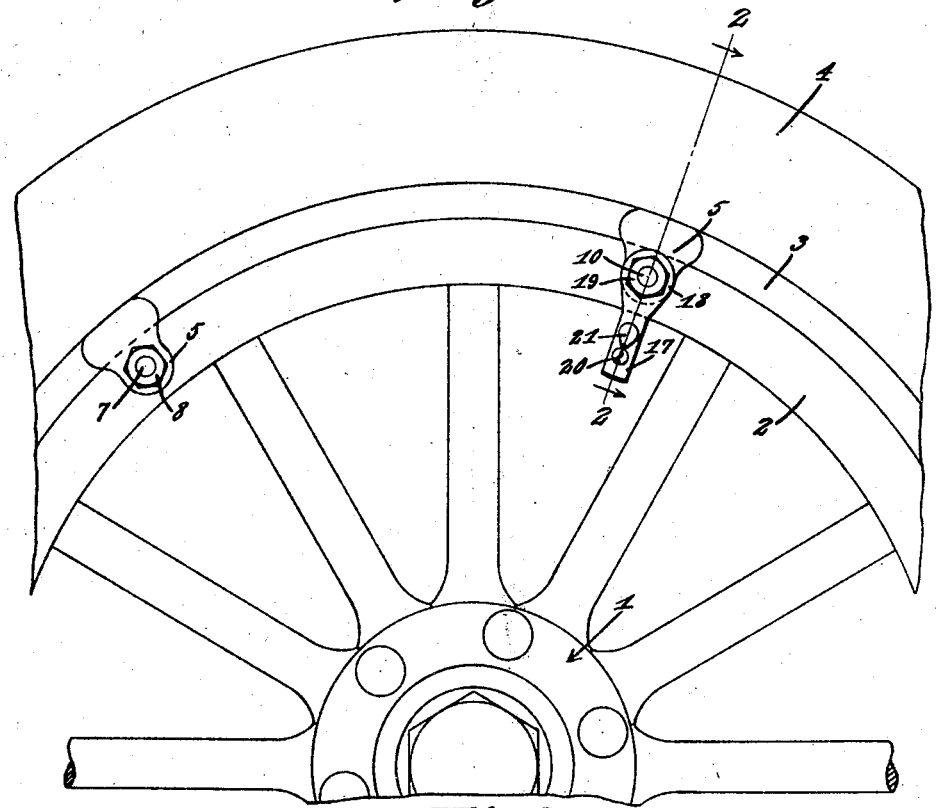
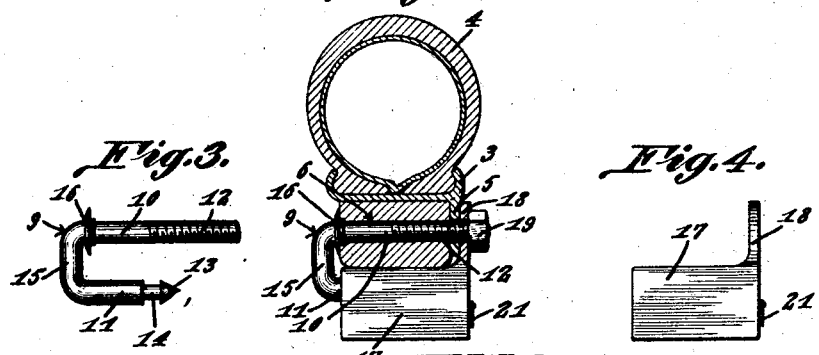
E. W. Cannam
G. S. Hugnin, INVENTORS.
BY Geo. F. Kimmel ATTORNEY.

Patented Sept. 13, 1927.

1,642,576

UNITED STATES PATENT OFFICE.

EARL W. CANNAM AND GEORGE S. HUGNIN, OF EUREKA, CALIFORNIA.

TIRE LOCK.

Application filed July 1, 1926. Serial No. 119,859.

This invention relates to locking devices and pertains particularly to a means for locking an automobile tire rim to the felloe of a wheel.

The primary object of this invention is the provision, in a manner as hereinafter set forth, of a means for locking a tire carrying rim to the felloe of a wheel in such a manner as to prevent the removal of the rim and tire from the wheel by an unauthorized person.

The invention contemplates the provision of a substantially U-shaped jaw member, having one leg thereof of greater length than the other, the longer leg being threaded and adapted to be extended through the usual bolt hole formed in the felloe of a wheel. Associated with the device is a lock adapted to lie against the inner face of the wheel felloe and having means for receiving in one end thereof the other leg of the locking jaw, the other end of the lock being provided with an apertured extension which is designed to overlie one face of the wheel felloe and the tire rim securing lug, so that the threaded leg of the securing jaw can be extended through the lug and the apertured extension of the lock, to receive a nut upon the end thereof. It will be readily seen that with a lock so constructed and arranged it would be impossible for an unauthorized person to remove the rim and tire from the wheel to which it is locked.

Another and final object is the provision of a tire rim lock which will be strong and durable, easy to attach and remove and comparatively inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 shows in side elevation a portion of an automobile wheel and a tire rim carried thereby, showing the device embodying this invention in applied position.

Figure 2 is a transverse section taken upon the line 2—2 of Figure 1.

Figure 3 is a detailed view of the locking jaw of the device and;

Figure 4 is a detailed side view of the lock body of the device.

Referring now to the drawing in detail wherein like numerals of reference indicate corresponding parts throughout the several views, the numeral 1 indicates generally, an automobile wheel, having a felloe 2. Positioned upon the felloe 2 is a tire rim 3 carrying a tire 4. The rim 3, is provided with the usual inwardly extending securing lugs 5, which lugs are provided with apertures as is well known, and align with certain transversely extending bolt passageways 6 formed through the felloe 2 of the wheel.

As is well known there are usually four or five of these lugs and corresponding bolt passageways through the felloe, and when the rim 3 is in position upon the felloe, with the lug apertures in alignment with the bolt passages, bolt members 7 are passed through the passages and through the lugs and a securing nut 8 is threaded upon the bolt thus securing the rim in position upon the felloe.

In order to apply the device embodying this invention, one of the bolt members 5 is removed and use is made of the bolt passageway for the application of the improved locking means.

The locking device embodying this invention comprises a substantially U-shaped locking jaw indicated as a whole by the numeral 9. This locking jaw has one leg 10 of greater length than the other leg 11, and as is shown the leg 10 is threaded from the free end inwardly as indicated at 12. The other leg 11 terminates in the pointed head 13 which head is attached to the end of the leg by means of the reduced neck portion 14. The legs are held in spaced parallel relation by means of the yoke 15 and surrounding the inner end of the leg 10 adjacent the yoke 15 is an abutting flange 16 which is adapted to abut the side of the felloe 2 when the device is in position.

As above stated the bolt 7 is removed for the application of the device embodying this invention, and the leg 10 of the locking jaw replaces the removed bolt extending through the felloe and a rim lug 5, in the manner shown in Figure 2. The leg 10 is so extended through the felloe as to position the leg 11 over the inner face of the felloe and when in this position the head portion 13 of the leg 11 is extended into one end of the lock body 17, which is positioned transversely of the inner face of the felloe 2 as shown in Figure 1. The interior of the lock is suitably constructed to receive and engage about the neck portion 14 behind the head 13 and thus hold the leg 11 in the lock body. The lock body 17, as is shown, is elongated and the end opposite from that into which the leg 11 extends, is provided with a laterally extending apertured ear portion 18 which overlies the lug 5 and has extended therethrough the free end of the leg 10. A securing nut 19 is then threaded upon the end of the leg 10 as shown in Figure 2. It will be readily seen from the foregoing description that even though this nut 19 were removed, the connection between the locking jaw 9 and the lock body 17, is such that the leg 10 could not be withdrawn from the passage 6 in the felloe and thus it would be impossible to disengage the lug 5 from the leg 10 for the removal of the rim 3. The end of the lock body opposite that into which the leg 11 extends, is provided with a key-way 20 for the insertion of a proper key for the release of the leg 11. A swinging cover member 21 may be attached to the face of the lock to cover the key opening 20 when no key is in position therein.

From the foregoing description it will be readily seen that with a lock of this character and position, an unauthorized person cannot possibly remove the rim 3 from the wheel felloe 2 and thus it would be a difficult matter for a thief to remove the tire. The locking device is so positioned that it is out of the way, lying upon the inner face of the wheel felloe 2 and nothing about the device extends beyond the sides of the tire and consequently all danger of the locking device being damaged by contact with other objects, is eliminated.

Having thus described our invention what we claim is:—

1. A lock of the character described, comprising a lock member, and a locking jaw having a portion adapted to be extended through a wheel felloe and the securing lug for a tire rim and engaged by said lock member.

2. A lock of the character described, comprising a lock member adapted to lie transversely of the inner face of a wheel felloe, an apertured ear extending from said lock member and adapted to overlie one of a series of securing lugs for a tire rim, and a securing device having a portion extended through said felloe, ear and overlying lug and another portion removably secured in said lock at the other side of the felloe from the apertured ear.

3. A lock of the character described, comprising a lock member adapted to lie transversely of the inner face of a wheel felloe, an apertured ear extending from said lock member and adapted to overlie one of a series of securing lugs for a tire rim, and a U-shaped securing device having one leg thereof adapted to extend through the felloe, the lug, and the apertured ear, the other leg of said device extending over the inner face of the felloe and removably secured in the body of said lock member.

4. A lock of the character described, comprising a lock member adapted to lie transversely of the inner face of a wheel felloe, an apertured ear extending from said lock member and adapted to overlie one of a series of securing lugs for a tire rim, and a substantially U-shaped securing device having one leg thereof of greater length than the other and adapted to extend through the felloe, said lug, and the apertured ear, said shorter leg having the free end formed to set up a penetrating head adapted to extend into said lock member from the opposite side of the felloe from the apertured ear, to be gripped and removably held by the lock member.

In testimony whereof, we affix our signatures hereto.

EARL W. CANNAM.
GEORGE S. HUGNIN.